US012654702B2

(12) United States Patent (10) Patent No.: US 12,654,702 B2
Mayr et al. (45) Date of Patent: Jun. 16, 2026

(54) ELECTRONICALLY CONTROLLED CRUISE CONTROL SYSTEM FOR MOTOR VEHICLES

(71) Applicant: Bayerische Motoren Werke Aktiengesellschaft, Munich (DE)

(72) Inventors: Jonas Mayr, Munich (DE); Benjamin Reicherzer, Karlsfeld (DE); Florian Schmitt, Gilching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 102 days.

(21) Appl. No.: 18/703,406

(22) PCT Filed: Sep. 6, 2022

(86) PCT No.: PCT/EP2022/074667
§ 371 (c)(1),
(2) Date: Apr. 22, 2024

(87) PCT Pub. No.: WO2023/072460
PCT Pub. Date: May 4, 2023

(65) Prior Publication Data
US 2025/0236296 A1     Jul. 24, 2025

(30) Foreign Application Priority Data
Oct. 28, 2021    (DE) ..................... 10 2021 128 182.2

(51) Int. Cl.
*B60W 30/16* (2020.01)
*B60D 1/62* (2006.01)

(52) U.S. Cl.
CPC ............. *B60W 30/162* (2013.01); *B60D 1/62* (2013.01); *B60W 2520/10* (2013.01);
(Continued)

(58) Field of Classification Search
CPC ........... B60W 30/162; B60W 2520/10; B60W 2530/203; B60W 2720/106;
(Continued)

(56) References Cited

U.S. PATENT DOCUMENTS 10,583,835 B2 *  3/2020  Ediger ................ B60W 30/143
2010/0007200 A1 *  1/2010  Pelosse ..................... B60T 7/20
303/7

(Continued)

FOREIGN PATENT DOCUMENTS

DE    10 2008 044 358 A1    6/2010
DE    10 2018 133 229 A1    6/2020
EP        3 670 214 A1    6/2020

OTHER PUBLICATIONS

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (2 pages.

(Continued)

*Primary Examiner* — Sze-Hon Kong
(74) *Attorney, Agent, or Firm* — Crowell & Moring LLP

(57) ABSTRACT

An electronically controlled cruise control system for motor vehicles, in which during a first closed-loop control operation the vehicle speed is set to a predetermined speed and/or during a second closed-loop control operation, whilst a desired distance from a vehicle in front is maintained, the speed is subjected to open- or closed-loop control, and, in order to reach and/or maintain the predetermined speed and/or the desired distance from the vehicle in front, a maximum acceleration of the vehicle is permitted. The maximum permitted acceleration is predetermined in accordance with a presence signal from a presence detection system of a trailer coupling attached to the vehicle.

14 Claims, 1 Drawing Sheet

(52) U.S. Cl.
CPC . *B60W 2530/203* (2020.02); *B60W 2720/106*
(2013.01); *B60W 2754/30* (2020.02)

(58) Field of Classification Search
CPC ..... B60W 2754/30; B60W 2050/0026; B60W
2720/10; B60W 30/14; B60D 1/62
See application file for complete search history.

(56) References Cited

U.S. PATENT DOCUMENTS

| | | | | |
|---|---|---|---|---|
| 2015/0314771 A1 * | 11/2015 | Dextreit | ............... | B60W 10/08 |
| | | | | 180/65.265 |
| 2017/0341583 A1 * | 11/2017 | Zhang | .................... | H04N 7/181 |
| 2018/0072118 A1 | 3/2018 | Dudar et al. | | |
| 2018/0105172 A1 | 4/2018 | Gesch et al. | | |
| 2019/0179010 A1 * | 6/2019 | Nasser | ..................... | B60D 1/62 |
| 2023/0047354 A1 * | 2/2023 | Wang | ............... | B60W 50/0097 |
| 2023/0129531 A1 * | 4/2023 | Fukui | .................. | B60W 50/085 |
| | | | | 701/1 |
| 2023/0294694 A1 * | 9/2023 | Oshita | .................... | B60K 31/00 |
| | | | | 701/96 |
| 2024/0300536 A1 * | 9/2024 | Silva | ..................... | B60W 30/16 |

OTHER PUBLICATIONS

International Search Report (PCT/ISA/210) issued in PCT Application No. PCT/EP2022/074667 dated Dec. 23, 2022 with English translation (5 pages).
German-language Written Opinion (PCT/ISA/237) issued in PCT Application No. PCT/EP2022/074667 dated Dec. 23, 2022 with English translation (10 pages).
German-language Search Report issued in German Application No. 10 2021 128 182.2 dated May 31, 2022 with partial English translation (11 pages).

* cited by examiner

ACC active — 10 trailer hitch A occupied? — 20 no 30 yes 50 amax1 amax2

40 60 driving speed closed-loop control = f(amax1)

driving speed closed-loop control = f(amax2)

ELECTRONICALLY CONTROLLED CRUISE CONTROL SYSTEM FOR MOTOR VEHICLES

BACKGROUND AND SUMMARY

The invention relates to an electronically controlled cruise control system and to corresponding methods for controlling an electronically controlled cruise control system according to the preambles of the independent claims.

Motor vehicles having electronically controlled cruise control systems (so-called cruise control systems) have been known for some time. Most presently available cruise control systems regulate the speed of the motor vehicle to a desired or targeted speed specified by the driver.

In addition to these longitudinal control systems, longitudinal control systems expanded with a distance control, so-called adaptive longitudinal control systems or cruise control systems, can be purchased from some producers. Such systems, which are offered, for example, by the applicant of the present patent application under the name "active cruise control", enable the vehicle speed to be regulated to a specified (target) speed during a first closed-loop control operation (ACC free driving) and to automatically guide the motor vehicle while maintaining a desired distance to a vehicle in front at a desired or a corresponding lower speed during a second closed-loop control operation (ACC following driving).

In principle, the generally known longitudinal control or cruise control, which maintains a specific specified speed, is expanded with an additional distance function or a following driving mode, so that the use of such an "active" cruise control is also possible in dense freeway and highway traffic. This so-called "active cruise control" maintains the specified desired or targeted speed when the ego lane is free (ACC free driving). If a distance sensor system attached to the motor vehicle, which can operate in particular on the basis of radar and/or camera and/or laser, detects a target object or (motor) vehicle in front in the ego lane, the ego speed is adapted—for example, by initiating a suitable braking or drive torque—to the speed of the motor vehicle traveling ahead (ACC following driving).

The most recent refinements of driver assistance systems with automated longitudinal control enable (possibly in consideration of a maximum speed or maximum target speed specified by the driver) an automated adaptation of the (target) speed according to the criteria of the German Road Traffic Regulations (StVO) and driving safety. The vehicle thus generally drives at the highest permitted speed or a recommended speed (target speed) specified for the corresponding road, maintains a distance to vehicles in front suitable for the external circumstances, or brakes at red traffic lights and for cornering and turning-off procedures accordingly. Such refinements can also be used in the scope of an autonomous driving mode.

To achieve and/or maintain a specified speed during a first closed-loop control operation and/or to maintain a desired distance to a vehicle in front, from aspects of comfort and/or safety only a specific maximum acceleration of the vehicle is permitted in each case, with which the vehicle is permitted to be accelerated during the closed-loop control operation.

It is the object of the invention to perform adaptations with respect to the maximum permitted acceleration in a control system of the type mentioned at the outset to improve comfort.

The object is achieved by each of the independent claims. Advantageous embodiments are described, inter alia, in the dependent claims. It is to be noted that additional features of a claim dependent on an independent claim can form, without the features of the independent claim or in combination with only a subset of the features of the independent claim, a separate invention independent of the combination of all features of the independent claim, which can be made the subject matter of an independent claim, a divisional application, or a subsequent application. This applies in the same manner to technical teachings described in the description which can form an invention independent of the features of the independent claims.

The basic concept of the invention is to permit different maximum accelerations during the closed-loop control operation of the cruise control system depending on specific operating situations of the vehicle, in order to enable an even more comfortable closed-loop control operation for the vehicle occupant.

According to a first aspect according to the invention, an electronically controlled cruise control system for motor vehicles is provided, in which during a (first) closed-loop control operation (ACC free driving), the vehicle speed is closed-loop controlled to a specified speed, wherein a maximum acceleration of the vehicle is permitted to achieve and/or maintain the specified speed and the maximum permitted acceleration is specified in dependence on an occupancy signal of an occupancy detection of a trailer hitch attached to the vehicle. The maximum permitted acceleration is specified in particular such that an uncomfortable closed-loop control is avoided.

Analogously thereto, according to a further aspect of the invention, a method for controlling an electronically controlled cruise control system for motor vehicles is proposed, wherein during a first closed-loop control operation (ACC free driving), the speed is fundamentally closed-loop controlled to a specified speed and a maximum acceleration of the vehicle is permitted to achieve and/or maintain the specified speed. According to the invention, the maximum permitted acceleration is specified in dependence on an occupancy signal of an occupancy detection of a trailer hitch attached to the vehicle.

According to a further aspect according to the invention, an electronically controlled cruise control system for motor vehicles is provided, in which during a second closed-loop control operation (ACC following driving), the speed is open-loop or closed-loop controlled while maintaining a desired distance to a vehicle in front and a maximum acceleration of the vehicle is permitted to achieve and/or maintain the desired distance to the vehicle in front, wherein the maximum permitted acceleration is specified in dependence on an occupancy signal of an occupancy detection of a trailer hitch attached to the vehicle.

Analogously thereto, according to a further aspect of the invention, a method for controlling an electronically controlled cruise control system for motor vehicles is proposed, wherein during a second closed-loop control operation (ACC following driving), the speed is open-loop or closed-loop controlled while maintaining a desired distance to a vehicle in front and only a maximum acceleration of the vehicle is permitted to achieve and/or maintain the desired distance to the vehicle in front. According to the invention, the maximum permitted acceleration is specified in dependence on an occupancy signal of an occupancy detection of a trailer hitch attached to the vehicle.

Refinements proposed hereinafter apply to both systems according to the invention and to the corresponding methods according to the invention, in particular also to a computer program product having control commands which carry out the respective proposed method when they are executed on a computer, and to a vehicle having at least one of the two electronically controlled cruise control systems according to the invention.

The electronically controlled cruise control system can be part of a driver assistance system, in which only the longitudinal guidance of the vehicle takes place in an automated manner. It can also be part of a system for (partial) automated longitudinal and lateral guidance and/or a system for autonomous driving.

The term "automated driving" comprises automated driving with any degree of automation. Exemplary degrees of automation are assisted, semiautomated, highly automated, or fully automated driving. These degrees of automation were defined by the Bundesanstalt für Straßenwesen [German Federal Highway Research Institute] (BASt) (see BASt publication "Forschung kompakt [compact research]", edition 11/2012). In assisted driving, the driver continuously executes the longitudinal or lateral guidance, while the system takes over the respective other function in certain limits.

The motor vehicle can be any type of vehicle having a drive system which is designed to participate in road traffic and to permit automated intervention in the longitudinal guidance. The drive system can be, for example, a conventional drive system having an internal combustion engine, a hybrid drive system having an internal combustion engine and an electric motor, or a solely electrically operated drive system. Other drive systems are also conceivable.

The specified (target) speed can either be specified manually by the driver or in an automated manner. In the case of a specification which is automated or can be influenced in an automated manner, the target speed can be specified in dependence on a permitted highest speed or a recommended speed (target speed) specified for the corresponding road.

The term occupancy signal can be understood as a signal which indicates an occupancy of the trailer hitch. The occupancy detection can be designed here to only emit a corresponding signal upon an occupancy of the trailer hitch. Alternatively, it can be provided that a signal (occupancy signal and non-occupancy signal) is made available both upon detected occupancy of the trailer hitch and also upon non-detected occupancy of the trailer hitch.

A limit of the acceleration in the positive and/or negative direction is to be understood in the meaning of a maximum permitted acceleration, wherein therefore a positive acceleration limiting value cannot be exceeded in the case of a limit in the positive direction and a negative acceleration value (=deceleration) cannot become greater in absolute value (no greater acceleration) in the case of a limit in the negative direction.

In one advantageous refinement of the invention, if an occupancy signal of the occupancy detection is present, a lower maximum acceleration is permitted than if an occupancy signal is not present or if a non-occupancy signal of the occupancy detection is present. It can furthermore be provided in particular that the electronically controlled cruise control system is designed such that the maximum permitted acceleration upon an existing occupancy signal of the occupancy detection is specified in dependence on at least one further parameter, in particular in dependence on the current vehicle speed and/or the difference between current vehicle speed and the specified speed to be achieved (and/or the speed of the vehicle in front).

There are various possibilities for specifying the maximum permitted acceleration upon detected occupancy of the trailer hitch. According to a first alternative, it can advantageously be provided that the maximum permitted acceleration upon an existing occupancy signal of the occupancy detection is specified based on speed-dependent acceleration values of a stored characteristic curve for the maximum permitted acceleration. In other words, a storage unit can be provided in the vehicle (or in a data cloud in data exchange with the vehicle), in particular in the electronically controlled cruise control system, in which at least one, ideally multiple speed-dependent characteristic curves are stored for the maximum permitted acceleration for various occupancy states of the trailer hitch.

Alternatively, it can be provided that the maximum permitted acceleration upon an existing occupancy signal of the occupancy detection is formed based on the result of a difference of the maximum permitted acceleration upon non-existing occupancy signal and a specified offset value. The offset value can be constant or can be specified variably in dependence on defined parameters, such as the speed.

Various possibilities also suggest themselves for the occupancy detection of the trailer hitch. In the simplest design, it can be provided according to the invention that the occupancy detection is configured to generate an occupancy signal by evaluating the occupancy of the plug connection associated with the trailer hitch, i.e., the occupancy detection establishes whether or not a plug is connected to a plug connection associated with the trailer hitch. If a plug is located on the plug connection, an occupancy of the trailer hitch is detected, otherwise an occupancy detection is not detected.

Alternatively, an occupancy detection can be carried out by means of surroundings sensors (such as a camera). Alternatively, it can be provided that the occupancy detection is configured to generate an occupancy signal by evaluating the occupancy of a plug connection associated with the trailer hitch and evaluating at least one further parameter (such as a camera). If contradictory signals are made available by both acquisition units, an optical and/or acoustic notification can be output to the driver.

Finally, it can be provided in a further advantageous embodiment of the invention that upon detected occupancy of the trailer hitch and adaptation/reduction of the maximum permitted acceleration during the cruise control, a notification is output to the driver.

The invention will now be explained in more detail on the basis of the following exemplary embodiment. In the figures

DETAILED DESCRIPTION OF THE DRAWINGS

Figures 1, 2:
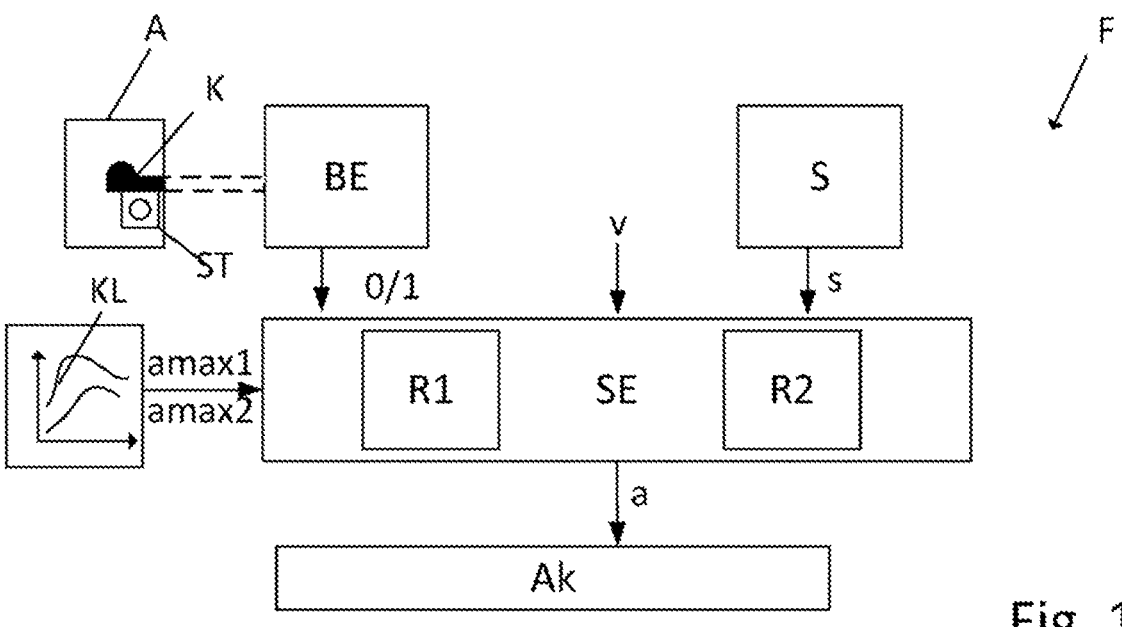
FIG. 1 shows an exemplary structure of an electronically controlled cruise control system according to the invention.
FIG. 2 shows a simplified flow chart for a method according to the invention.

FIG. 1 shows an electronically controlled cruise control system F having a control unit SE, which closed-loop controls the vehicle speed v to a specified speed during a first closed-loop control operation (ACC free driving) by means of a first controller unit R1. In addition, the control unit comprises a second controller unit R2, which open-loop or closed-loop controls the speed to maintain a minimum distance to a vehicle in front, at latest, upon reaching or falling below a specified minimum distance during a second closed-loop control operation (ACC following driving). To achieve and/or maintain the specified speed and/or the specified minimum distance, the control unit SE causes acceleration or deceleration of the vehicle by outputting an acceleration value a, in that corresponding actuators Ak (e.g., engine, clutch, brake) are actuated based on the acceleration value a.

To detect relevant items of surroundings information, in particular relevant vehicles in front, the control unit SE receives sensor signals s from one or more surroundings sensors S monitoring and/or analyzing the surroundings.

Furthermore, the control unit SE receives a speed signal v and an occupancy signal 0 or 1 of an occupancy detection BE for a trailer hitch A attached to the vehicle, which comprises a plug connection ST in addition to the hitch device K. For the occupancy detection of the trailer hitch A, it is evaluated whether the plug connection ST is occupied, i.e., a plug is connected to the plug connection ST. If a plug occupancy is detected, the occupancy detection BE sends a signal 1 to the control unit SE, otherwise no signal or a signal 0.

Furthermore, the control unit SE is connected to a storage unit SP, wherein multiple speed-dependent characteristic curves for a maximum permitted acceleration are stored in the storage unit for consideration in the cruise controls. Thus, for example, a speed-dependent characteristic curve KL is stored in each case for the maximum permitted acceleration for a detected driving operation of the vehicle without trailer and with trailer.

Finally, the control unit SE is configured, for the cruise control during the first closed-loop control operation and/or during the second closed-loop control operation for the open-loop cruise control or closed-loop cruise control based on the acceleration limiting values stored in the characteristic curves KL, to specify or select the respective suitable maximum permitted acceleration (e.g., amax1 or amax2) in dependence on the occupancy signal 0 or 1 of the occupancy detection BE of the trailer hitch A attached to the vehicle and to take it into consideration accordingly in the closed-loop control.

In particular, it can be provided here that upon detected occupancy of the trailer hitch, an identical maximum permitted acceleration or different maximum permitted accelerations are specified for both controller units R1 and R2. Alternatively, individual characteristic curves having speed-dependent maximum permitted acceleration values can each be stored both for the occupancy state of the trailer hitch A and for each controller unit R1 and R2 and according to the conditions (controller unit 1 or 2 active, trailer detected or not), the relevant speed-dependent value for the maximum permitted acceleration can be determined and specified from the applicable characteristic curve.

A design of the method according to the invention will be explained in more detail on the basis of FIG. 2.

The method begins in step 10, as soon as a cruise control system ACC is active. If this is the case, it is checked in the next step 20 whether a trailer hitch A attached to the vehicle is occupied.

If an occupied trailer hitch A is not detected, the sequence passes to step 30. In consideration of the current speed v, the specified speed, and possibly in consideration of the distance to a target object in front, a maximum permitted acceleration amax1 is specified there for the closed-loop control, which is taken into consideration in the next step 40 in the cruise control.

If an occupied trailer hitch A is detected in step 20, the sequence passes to step 50. In consideration of the current speed v, the specified speed, and possibly in consideration of the distance to a target object in front, a maximum permitted acceleration amax2 reduced for the closed-loop control is specified there, which is less than the maximum permitted acceleration amax1. In the next step 60, the cruise control takes place in consideration of this reduced maximum acceleration amax2. The maximum permitted acceleration amax2 upon detected trailer hitch occupancy is specified or reduced in relation to the maximum permitted acceleration amax1 enough that a comfortable acceleration level with attached trailer is or will be achieved for the driver.

What is claimed is:

1. An electronically controlled cruise control system for a motor vehicle, in which during a first closed-loop control operation, a vehicle speed is open-loop or closed-loop controlled to a specified speed, wherein a maximum permitted acceleration of the motor vehicle is permitted to achieve and/or maintain the specified speed, wherein the maximum permitted acceleration is determined based on an occupancy signal of an occupancy detection of a trailer hitch attached to the motor vehicle;

wherein the occupancy detection is configured to generate the occupancy signal by evaluating an occupancy of a plug connection associated with the trailer hitch and evaluating at least one other parameter; and wherein the electronically controlled cruise control system determines whether a contradiction exists between the occupancy signal and the at least one other parameter and, based on existence of the contradiction, outputs an optical and/or acoustic notification to a driver of the motor vehicle.

2. The electronically controlled cruise control system according to claim 1, wherein upon receipt of an existing occupancy signal of the occupancy detection, a lower maximum acceleration is permitted than upon receipt of a non-existing occupancy signal of the occupancy detection.

3. The electronically controlled cruise control system according to claim 1, wherein the maximum permitted acceleration upon receipt of an existing occupancy signal of the occupancy detection is determined based on at least one other parameter including a current vehicle speed and/or a difference between the current vehicle speed and the specified speed to be achieved.

4. The electronically controlled cruise control system according to claim 1, wherein the maximum permitted acceleration upon receipt of an existing occupancy signal of the occupancy detection is determined based on speed-dependent acceleration values of a stored characteristic curve for the maximum permitted acceleration.

5. The electronically controlled cruise control system according to claim 1, wherein the maximum permitted acceleration upon receipt of an existing occupancy signal of the occupancy detection is determined based on a result of a difference of the maximum permitted acceleration upon receipt of a non-existing occupancy signal of the occupancy detection and a specified offset value.

6. A vehicle having an electronically controlled cruise control system for motor vehicles according to claim 1.

7. An electronically controlled cruise control system for a motor vehicle, in which during a second closed-loop control operation, a vehicle speed is open-loop or close-loop controlled while maintaining a desired distance to a vehicle in front, wherein a maximum permitted acceleration of the motor vehicle is permitted to achieve and/or maintain the desired distance to the vehicle in front, wherein the maximum permitted acceleration is determined based on an occupancy signal of an occupancy detection of a trailer hitch attached to the motor vehicle;

wherein the occupancy detection is configured to generate the occupancy signal by evaluating an occupancy of a plug connection associated with the trailer hitch and evaluating at least one other parameter; and wherein the electronically controlled cruise control system determines whether a contradiction exists between the occupancy signal and the at least one other parameter and, based on existence of the contradiction, outputs an optical and/or acoustic notification to a driver of the motor vehicle.

8. The electronically controlled cruise control system according to claim 7, wherein upon receipt of an existing occupancy signal of the occupancy detection, a lower maximum acceleration is permitted than upon receipt of a non-existing occupancy signal of the occupancy detection.

9. The electronically controlled cruise control system according to claim 7, wherein the maximum permitted acceleration upon receipt of an existing occupancy signal of the occupancy detection is determined based on at least one other parameter including a current vehicle speed and/or a difference between the current vehicle speed and the specified speed to be achieved.

10. The electronically controlled cruise control system according to claim 7, wherein the maximum permitted acceleration upon receipt of an existing occupancy signal of the occupancy detection is determined based on speed-dependent acceleration values of a stored characteristic curve for the maximum permitted acceleration.

11. The electronically controlled cruise control system according to claim 7, wherein the maximum permitted acceleration upon receipt of an existing occupancy signal of the occupancy detection is determined based on a result of a difference of the maximum permitted acceleration upon receipt of a non-existing occupancy signal of the occupancy detection and a specified offset value.

12. A vehicle having an electronically controlled cruise control system according to claim 7.

13. A method for controlling an electronically controlled cruise control system for a motor vehicle, wherein during a first closed-loop control operation, a speed is fundamentally open-loop or closed-loop controlled to a specified speed and only a maximum permitted acceleration of the motor vehicle is permitted to achieve and/or maintain the specified speed, wherein the maximum permitted acceleration is determined based on an occupancy signal of an occupancy detection of a trailer hitch attached to the motor vehicle;

wherein upon receipt of an existing occupancy signal of the occupancy detection, a lower maximum acceleration is permitted than upon receipt of a non-existing occupancy signal of the occupancy detection; and wherein the electronically controlled cruise control system determines whether a contradiction exists between the occupancy signal and the at least one other parameter and, based on existence of the contradiction, outputs an optical and/or acoustic notification to a driver of the motor vehicle.

14. A method for controlling an electronically controlled cruise control system for a motor vehicle, wherein during a second closed-loop control operation, a speed is open-loop or closed-loop controlled while maintaining a desired distance to a vehicle in front and only a maximum permitted acceleration of the motor vehicle is permitted to achieve and/or maintain a desired distance to the vehicle in front, wherein the maximum permitted acceleration is determined based on an occupancy signal of an occupancy detection of a trailer hitch attached to the motor vehicle;

wherein upon receipt of an existing occupancy signal of the occupancy detection, a lower maximum acceleration is permitted than upon receipt of a non-existing occupancy signal of the occupancy detection; and wherein the electronically controlled cruise control system determines whether a contradiction exists between the occupancy signal and the at least one other parameter and, based on existence of the contradiction, outputs an optical and/or acoustic notification to a driver of the motor vehicle.

* * * * *